(12) United States Patent
Zheng et al.

(10) Patent No.: US 9,191,845 B2
(45) Date of Patent: Nov. 17, 2015

(54) CHANNEL MEASUREMENT METHOD AND APPARATUS

(71) Applicant: HUAWEI TECHNOLOGIES CO., LTD., Shenzhen (CN)

(72) Inventors: Juan Zheng, Beijing (CN); Lixia Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 63 days.

(21) Appl. No.: 14/069,826

(22) Filed: Nov. 1, 2013

(65) Prior Publication Data

US 2014/0086085 A1 Mar. 27, 2014

Related U.S. Application Data

(63) Continuation of application No. PCT/CN2012/075104, filed on May 4, 2012.

(30) Foreign Application Priority Data

May 9, 2011 (CN) .......................... 2011 1 0118188

(51) Int. Cl.
*G08C 15/00* (2006.01)
*H04W 24/08* (2009.01)
(Continued)

(52) U.S. Cl.
CPC .............. *H04W 24/08* (2013.01); *H04L 5/0048* (2013.01); *H04L 5/0092* (2013.01); *H04B 7/063* (2013.01); *H04B 7/0639* (2013.01); *H04L 25/0226* (2013.01)

(58) Field of Classification Search
CPC ...................................................... H04L 47/10
USPC ......................................................... 370/252
See application file for complete search history.

(56) References Cited

U.S. PATENT DOCUMENTS

2010/0014481 A1 1/2010 Ko et al.
2011/0275396 A1* 11/2011 Nishio ................. H04B 7/0615
455/509
2012/0190356 A1 7/2012 Zhao et al.

FOREIGN PATENT DOCUMENTS

CN 101932014 12/2010
CN 102036264 4/2011
(Continued)

OTHER PUBLICATIONS

International Search Report mailed Aug. 2, 2012 in corresponding International Application No. PCT/CN2012/075104.
(Continued)

*Primary Examiner* — Samina Choudhry
(74) *Attorney, Agent, or Firm* — Staas & Halsey LLP (57) ABSTRACT

Embodiments of the present invention provide a channel measurement method and apparatus. The method includes: configuring, for each frequency band of N frequency bands having a same carrier frequency, according to a measurement demand, reference signal information corresponding to each frequency band, so that reference signal densities included in configured reference signal information of at least two frequency bands of the N frequency bands are different, where N is a positive integer greater than or equal to 2, the reference signal information refers to information required to generate a reference signal, the reference signal density refers to a distribution density on a time domain or a distribution density on a frequency domain of the reference signal or a pattern of the reference signal; and notifying a user equipment of the reference signal information, so that the user equipment performs channel measurement according to the reference signal information.

20 Claims, 3 Drawing Sheets

Configure, for each frequency band of N frequency bands having a same carrier frequency, according to a measurement demand, reference signal information corresponding to each frequency band, so that reference signal densities included in configured reference signal information of at least two frequency bands of the N frequency bands are different — 101

Notify a user equipment of the reference signal information, so that the user equipment performs channel measurement according to the reference signal information — 102

(51) Int. Cl.
*H04L 5/00* (2006.01)
*H04L 25/02* (2006.01)
*H04B 7/06* (2006.01)

(56) References Cited

FOREIGN PATENT DOCUMENTS

| EP | 2383918 | 11/2011 |
|---|---|---|
| WO | WO2010/008897 | 1/2010 |
| WO | WO2010087176 | 8/2010 |

OTHER PUBLICATIONS

*Backward compatible design of downlink reference signals in LTE-Advanced*, 3GPP TSG RAN WG1 Meeting #55bis, R1-090023, Ljubljana, Slovenia, Jan. 12-16, 2009, XP050317971, pp. 1-6.
Extended European Search Report, dated Mar. 19, 2014, in corresponding European Application No. 12782417.5 (9 pp.).
*LS on additional carrier types for LTE-A*, 3GPP TSG-RAN WG1 #59bis, R1-100828, Valencia, Spain, Jan. 18-22, 2010 (2 pp.).
International Search Report and Written Opinion, dated Aug. 2, 2012, in corresponding International Application No. PCT/CN2012/075104 (10 pp.).

\* cited by examiner

CHANNEL MEASUREMENT METHOD AND APPARATUS

CROSS-REFERENCE TO RELATED APPLICATIONS

This application is a continuation of International Application No. PCT/CN2012/075104, filed on May 4, 2012, which claims priority to Chinese Patent Application No. 201110118188.6, filed on May 9, 2011, both of which are hereby incorporated by reference in their entireties.

TECHNICAL FIELD

Embodiments of the present invention relate to the field of wireless communication, and in particular, to a channel measurement method and apparatus.

BACKGROUND

In a wireless communication system, because of factors such as mobility of a user equipment (User equipment, UE) and multipath propagation of a wireless signal, a channel state between a base station and the UE changes with the change of time and a frequency. In order to improve transmission efficiency of the system, it is expected that the base station can effectively utilize channel state information between the base station and the UE, and schedule each UE onto a time frequency resource corresponding to a best channel state of the UE. Based on this, the base station needs to acquire channel state information of each UE.

In a wireless communication system, such as an LTE (Long term evolution, long term evolution)/LTE-A (LTE-Advanced, long term evolution-advanced) system, a base station generally acquires a channel state between the base station and a UE through channel state information reported by the UE. Specifically, the UE may obtain, through a calculation, channel quality and an interference level between the base station and the UE by measuring a downlink reference signal sent by the base station, and further obtain downlink channel state information (Channel State Information, CSI) between the base station and the UE. Here, the downlink reference signal mainly includes a cell-specific reference signal (Cell-specific reference signal, CRS) and a channel-state information reference signal (Channel-State Information reference signal, CSI-RS). Moreover, the base station may also acquire uplink channel quality between the base station and the UE by measuring an uplink reference signal sent by the UE, such as an uplink sounding signal SRS (Sounding Reference Signal, SRS); for a system having a channel reciprocity characteristic, such as a TDD system, the base station may obtain downlink channel quality between the base station and the UE through the uplink channel quality.

In a wireless communication system, for measurement of channel state information, two factors are mainly considered for design of a reference signal. A first factor is that measurement precision can be satisfied, namely, it needs to be ensured that channel state information obtained through measurement is basically the same as an actual channel condition between a base station and a UE, so that the base station can more accurately perform rate matching on the UE, namely, can adopt a more appropriate modulation coding scheme (Modulation Coding Scheme, MCS) for data scheduling of the user and schedule the user onto a more appropriate time frequency resource; a second factor is that it needs to be considered that an overhead of the reference signal is as small as possible, so as to avoid causing an excessive waste of a data resource.

For a same UE, reference signals used on different frequency bands in a same carrier may be used for different measurement purposes, for example, used for channel quality measurement and interference level measurement separately, and reference signal characteristics required for these two types of measurement may be different. However, currently the base station does not consider different measurement purposes of different frequency bands for reference signal characteristics of frequency bands configured by the UE, and in this way, the foregoing two factors cannot be considered completely, so that precision of channel quality measurement or interference level measurement on a part of frequency bands is insufficient, or so that reference signal overheads on a part of frequency bands are increased.

SUMMARY

Embodiments of the present invention provide a channel measurement method and apparatus, which can reduce a reference signal overhead.

In one aspect, a channel measurement method is provided, and includes: configuring, for each frequency band of N frequency bands having a same carrier frequency, according to a measurement demand, reference signal information corresponding to each frequency band, so that reference signal densities included in configured reference signal information of at least two frequency bands of the N frequency bands are different, where N is a positive integer greater than or equal to 2, the reference signal information refers to information required to generate a reference signal, the reference signal density refers to a distribution density on a time domain or a distribution density on a frequency domain of the reference signal or a pattern of the reference signal; and notifying a user equipment of the reference signal information, so that the user equipment performs channel measurement according to the reference signal information.

In another aspect, a channel measurement method is provided, and includes: receiving reference signal information which corresponds to each frequency band of N frequency bands and is notified by a network device, where the N frequency bands have a same carrier frequency, the reference signal information is configured for each frequency band by the network device according to a measurement demand, and reference signal densities included in configured reference signal information of at least two frequency bands of the N frequency bands are different, where N is a positive integer greater than or equal to 2, the reference signal information refers to information required to generate a reference signal, the reference signal density refers to a distribution density on a time domain or a distribution density on a frequency domain of the reference signal or a pattern of the reference signal; and performing channel measurement according to the reference signal information.

In another aspect, a network device is provided, and includes: a configuring unit, configured to configure, for each frequency band of N frequency bands having a same carrier frequency, according to a measurement demand, reference signal information corresponding to each frequency band, so that reference signal densities included in configured reference signal information of at least two frequency bands of the N frequency bands are different, where N is a positive integer greater than or equal to 2, the reference signal information refers to information required to generate a reference signal, the reference signal density refers to a distribution density on a time domain or a distribution density on a frequency domain of the reference signal or a pattern of the reference signal; and a notifying unit, configured to notify a user equipment of the reference signal information configured by the configuring unit, so that the user equipment performs channel measurement according to the reference signal information.

In another aspect, a user equipment is provided, and includes: a receiving unit, configured to receive reference signal information which corresponds to each frequency band of N frequency bands and is notified by a network device, where the N frequency bands have a same carrier frequency, the reference signal information is configured for each frequency band by the network device according to a measurement demand, and reference signal densities included in configured reference signal information of at least two frequency bands of the N frequency bands are different, where N is a positive integer greater than or equal to 2, the reference signal information refers to information required to generate a reference signal, the reference signal density refers to a distribution density on a time domain or a distribution density on a frequency domain of the reference signal or a pattern of the reference signal; and a measuring unit, configured to perform channel measurement according to the reference signal information received by the receiving unit.

In the embodiments of the present invention, for different frequency bands in a same carrier, respective reference signal information is configured, so that reference signal densities included in reference signal information of at least two frequency bands are different, so that reference signal information can be designed pointedly according to different measurement demands of different frequency bands, and a reference signal overhead can be reduced in a case that reference signal measurement precision is ensured.

BRIEF DESCRIPTION OF DRAWINGS

To illustrate the technical solutions in the embodiments of the present invention more clearly, the following briefly introduces accompanying drawings required for describing the embodiments or the prior art. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communication systems, such as, a GSM, code division multiple access (CDMA, Code Division Multiple Access) system, wideband code division multiple access (WCDMA, Wideband Code Division Multiple Access), general packet radio service (GPRS, General Packet Radio Service), long term evolution (LTE, Long Term Evolution), and an advanced LTE technology (LTE-A, LTE-Advanced). For convenience of illustration, in the technical solutions of the present invention, an LTE/LTE-A wireless communication system is taken as an example for description, to which the present invention is not limited, and the technical solutions of the present invention are likewise applicable to other wireless communication systems.

A user equipment involved in the present invention may communicate, through a radio access network (such as, RAN, Radio Access Network), with one or more core networks, and may specifically be a device such as a UE (User Equipment, user equipment) or a relay node.

Figure 1:
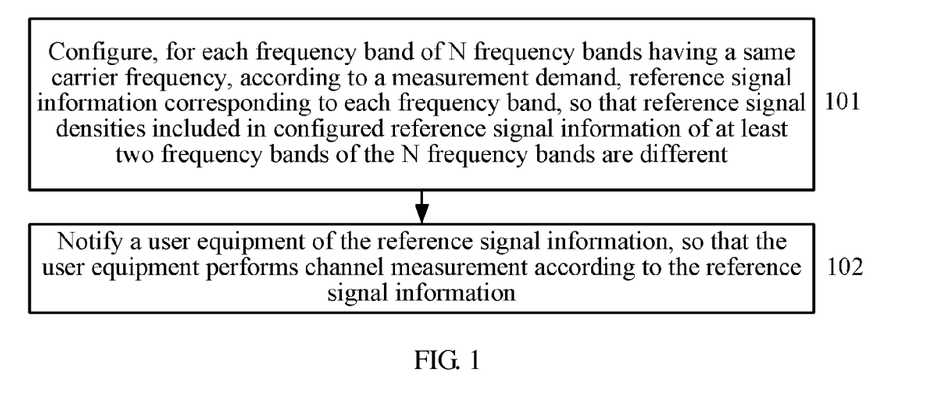
FIG. 1 is a flow chart of a channel measurement method according to an embodiment of the present invention.

FIG. 1 is a flow chart of a channel measurement method according to an embodiment of the present invention. The method in FIG. 1 may be executed by a network side device (such as a base station, a base station controller, a radio network controller, a mobility management entity, an access gateway, or a multi-cell/multicast coordinated entity).

101: Configure, for each frequency band of N frequency bands having a same carrier frequency, according to a measurement demand, reference signal information corresponding to each frequency band, so that reference signal densities included in configured reference signal information of at least two frequency bands of the N frequency bands are different, where N is a positive integer greater than or equal to 2, the reference signal information refers to information required to generate a reference signal, the reference signal density refers to a distribution density on a time domain or a distribution density on a frequency domain of the reference signal or a pattern of the reference signal (reference signal pattern).

102: Notify a user equipment of the reference signal information, so that the user equipment performs channel measurement according to the reference signal information.

In the embodiment of the present invention, for different frequency bands in a same carrier, respective reference signal information is configured, so that reference signal densities included in reference signal information of at least two frequency bands are different, so that reference signal information can be designed pointedly according to different measurement demands of different frequency bands, and a reference signal overhead can be reduced in a case that it is ensured that measurement precision is satisfied when a reference signal is utilized to perform channel measurement.

Figure 2:
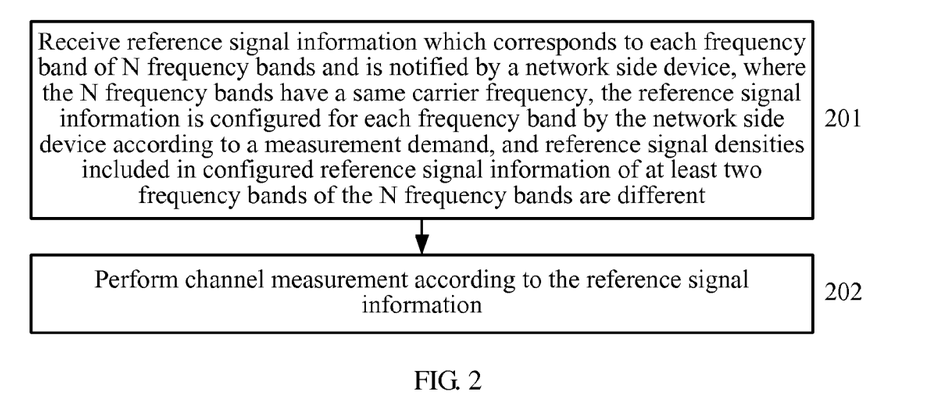
FIG. 2 is a flow chart of a channel measurement method according to another embodiment of the present invention.

FIG. 2 is a flow chart of a channel measurement method according to another embodiment of the present invention. The method in FIG. 2 is mainly executed by a user equipment, and corresponds to the method in FIG. 1.

201: Receive reference signal information which corresponds to each frequency band of N frequency bands and is notified by a network side device, where the N frequency bands have a same carrier frequency, the reference signal information is configured for each frequency band by the network side device according to a measurement demand, and reference signal densities included in configured reference signal information of at least two frequency bands of the N frequency bands are different, where N is a positive integer greater than or equal to 2, the reference signal information refers to information required to generate a reference signal, the reference signal density refers to a distribution density on a time domain or a distribution density on a frequency domain of the reference signal or a pattern of the reference signal.

202: Perform channel measurement according to the reference signal information.

In the embodiment of the present invention, for different frequency bands in a same carrier, respective reference signal information is configured, so that reference signal densities included in reference signal information of at least two frequency bands are different, so that reference signal information can be designed pointedly according to different measurement demands of different frequency bands, and a reference signal overhead can be reduced in a case that it is ensured that measurement precision is satisfied when a reference signal is utilized to perform channel measurement.

Under an LTE/LTE-A scenario, a CRS pattern (CRS pattern) which may perform channel measurement and interference estimation simultaneously is distributed in the time by taking 1 ms as a period, so as to satisfy a demand of a channel frequency related characteristic on the frequency. For a CSI-RS mainly used for channel quality measurement, because a service signal is relatively stable when passing through a channel and a base station may adopt, for example, a muting technology (Muting) to ensure CSI-RS measurement precision, a longer time period (such as 5 ms, 10 ms, 20 ms, 40 ms, and 80 ms) may be adopted for time distribution, so as to likewise satisfy a demand of a channel frequency related characteristic on the frequency.

For a same UE, on different frequency bands of a same carrier, if reference signal densities which are configured by a base station for the UE and are used for channel quality and/or interference level measurement are the same, reference signals cannot be optimally utilized. For example, under some scenarios, the base station needs to configure an appropriate reference signal density according to different measurement purposes of the UE on different frequency bands, so as to implement that a reference signal overhead is reduced as much as possible under a requirement of satisfying precision of channel quality and interference level measurement.

One typical scenario is a system to which carrier segment (Carrier segment) or carrier extension (Carrier extension) is applied. For such system, frequency band resources may be divided into two parts, one part is a backward compatible carrier part, and the other part is a non-backward compatible carrier part (such as a carrier segment or carrier extension part). The non-backward compatible part does not bear any control channel such as a synchronization channel, a broadcast channel, a system information block (System Information Block, SIB) channel, a paging channel, or a downlink physical layer control channel, so that more data resources may be provided, thereby improving spectral efficiency of the system. In this case, at the backward compatible part, because of existence of a reference signal CRS with a high distribution density, a CSI-RS mainly used for channel quality measurement may be configured with a longer time period. In this case, if a UE utilizes the CSI-RS to perform channel quality and interference level measurement at the non-backward compatible part and adopts a CSI-RS with a distribution density same as that of the backward compatible part, it is caused that measurement precision of the non-backward compatible part cannot be satisfied; on the other hand, if the UE utilizes the CRS to perform channel quality and interference level measurement at the non-backward compatible part and adopts a CRS with a distribution density same as that of the backward compatible part, it is also caused that a reference signal overhead of the non-backward compatible part is increased, thereby influencing data efficiency of the non-backward compatible part.

In the method in the embodiment of the present invention, a reference signal configuration can be separately performed according to different channel states undergone by a UE on different frequency bands in a same carrier and/or different purposes based on reference signal measurement and/or consideration for reference signal overhead demands of different frequency bands, so as to satisfy channel state measurement precision of different frequency bands and implement maximization of data resource utilization rates of different frequency bands.

Figure 3:
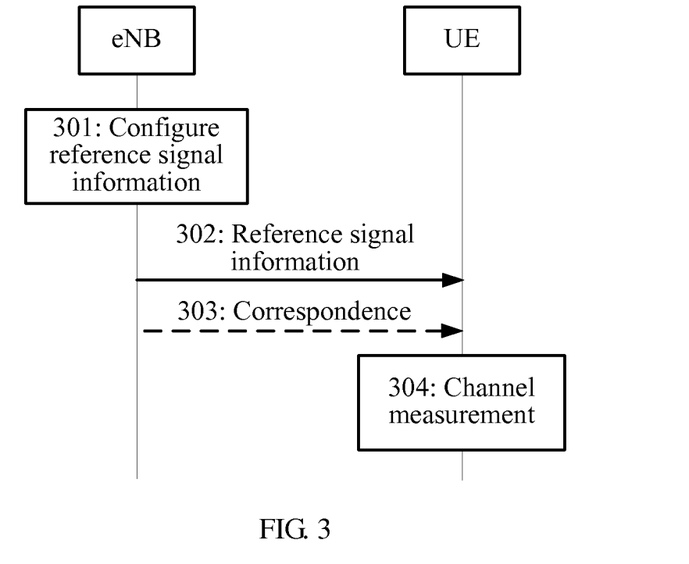
FIG. 3 is a schematic flow chart of a channel measurement procedure according to an embodiment of the present invention.

FIG. 3 is a schematic flow chart of a channel measurement procedure according to an embodiment of the present invention. In FIG. 3, for convenience of description, a UE is used to represent a user equipment, but the embodiment of the present invention is not limited to a specific system represented by the term. The embodiment of the present invention may be applied to any system similarly, and these applications all fall within the scope of the embodiment of the present invention.

Additionally, in the embodiment of FIG. 3, a base station eNB is used as a network side device configuring a reference signal, to which the embodiment of the present invention is not limited. In another system, a reference signal may be configured through another network side device, such as a radio network controller RNC (Radio Network Controller). These changes all fall within the scope of the embodiment of the present invention.

301: An eNB configures, for each frequency band of N frequency bands having a same carrier frequency, according to a measurement demand, reference signal information corresponding to each frequency band, so that reference signal densities included in configured reference signal information of at least two frequency bands of the N frequency bands are different. N is a positive integer greater than or equal to 2.

The measurement demand may include a measurement precision demand, namely, to ensure that channel state information obtained through measurement is basically the same as actual channel state information, and may further include consideration for an overhead of a reference signal used for measurement, namely, to ensure that the overhead of the reference signal used for measurement is as small as possible, and may further include a demand for different measurement purposes, namely, to configure different reference signal information according to whether a reference signal is used for channel quality measurement or used for interference level measurement, where the reference signal information includes a reference signal density. For example, for a reference signal mainly used for channel quality measurement, a configured reference signal density may be low, and on the contrary, for a reference signal mainly used for interference level measurement, a configured reference signal density may be high.

Each frequency band may be formed of one sub-carrier or more sub-carriers, or formed of one or more physical resource blocks PRB (Physical resource block), or formed of one or more resource block groups RBG (Resource block group). Each frequency band may also be the foregoing backward compatible carrier part, or the foregoing non-backward compatible carrier part (such as a carrier segment or carrier extension part). A plurality of sub-carriers (or PRB/RBG) may be consecutive, and may also be inconsecutive.

The eNB configures reference signal information of different frequency bands in a same carrier for each UE, and each frequency band corresponds to a piece of reference signal information. The reference signal information refers to information required to generate a reference signal. The reference signal information includes a reference signal density, where reference signal densities included in reference signal information of at least two frequency bands are different. The reference signal may be a reference signal for performing channel quality measurement and/or interference level measurement, such as a CSI-RS, a CRS or a multicast service reference signal, or other reference signals which may perform channel quality measurement and/or interference level measurement. The reference signal density may be a distribution density on a time domain or a distribution density on a frequency domain of the reference signal or a pattern of the reference signal, and may also be a combination of these distribution densities.

The distribution density on a time domain may be a time interval between two neighboring reference signal patterns or two neighboring reference signals in the time on a same frequency band, and the time interval may be one or more subframes, and may also be one or more radio frames; the distribution density on a time domain may further be a distribution period of a reference signal or a reference signal pattern on a time domain on a same frequency band; the reference signal pattern refers to a resource unit having same reference signal distribution, and the resource unit may be a PRB.

The distribution density on a frequency domain may be a frequency interval between two neighboring reference signals or two neighboring reference signal patterns in the frequency on a same frequency band, and the frequency interval may be one or more subcarriers, may also be one or more PRBs, and may also be one or more RBGs.

The eNB configures a distribution density of a reference signal on different frequency bands on the time domain, which may be that a time interval between two neighboring reference signals or two neighboring reference signal patterns in the time on a same frequency band may be directly defined, may also be implemented by configuring different reference signal periods or reference signal pattern periods, and may also be implemented by configuring a specific downlink subframe mode, where the specific downlink subframe mode corresponds to a reference signal density mode in a one-to-one manner. For example, on an FDD UL (frequency division duplexing uplink, Frequency Division Duplexing Uplink) frequency band, some uplink subframes may be used as downlink subframes, and in this case, a reference signal only occurs on the downlink subframe, namely, to keep consistent with a downlink subframe mode of the FDD UL frequency band; on the other hand, the eNB configures a distribution density of a reference signal on different frequency bands on the frequency domain, which may be that a frequency interval between two neighboring reference signals or two neighboring reference signal patterns in the frequency on a same frequency band may be directly defined.

It should be noted that, in the embodiment of the present invention, there may also be other manners for the eNB to configure a reference signal density on different frequency bands, which is not limited here.

Besides the reference signal density, the reference signal information may further include reference signal transmit power control information, a bandwidth based on which a reference signal is generated, reference signal port information, reference signal location index information, and reference signal muting (Muting) mode information.

302: The eNB notifies the UE of reference signal information corresponding to different frequency bands in a same carrier.

The eNB may notify the user equipment of the reference signal information through a single piece of signaling carrying reference signal information corresponding to the N frequency bands; or the eNB may notify the user equipment of the reference signal information through N pieces of signaling, where each of the N pieces of signaling carries the reference signal information corresponding to each frequency band of the N frequency bands.

For example, the eNB may notify the reference signal information through RRC (radio resource control, Radio Resource Control) broadcast signaling, RRC dedicated signaling or physical layer signaling. For example, the eNB may notify the UE of reference signal density configurations of different frequency bands through user equipment-specific (UE-Specific) signaling or cell-specific (Cell-Specific) signaling or physical layer signaling. When the cell-specific signaling is adopted, notification may be given through broadcast signaling (MIB), and notification may also be given through system information block (System Information Block, SIB) signaling. Here, the reference signal density may be a distribution period of the reference signal or the reference signal pattern on the time domain, may also be a frequency interval of the reference signal or the reference signal pattern on the frequency domain, and may also be a combination of the two.

Alternatively, as an embodiment, the reference signal information further includes a bandwidth based on which the reference signal is generated, so that the user equipment generates the reference signal according to the bandwidth, where the bandwidth is a bandwidth of a frequency band corresponding to the reference signal information, or a bandwidth of any one frequency band of the N frequency bands, or a maximum bandwidth in the N frequency bands, or a total bandwidth of K frequency bands of the N frequency bands, where K is a positive integer smaller than or equal to N.

303: The eNB may further notify the UE of correspondence between the reference signal information and each frequency band of the N frequency bands, so that the user equipment acquires, according to the correspondence, reference signal information corresponding to each frequency band of the N frequency bands. 303 is an optional procedure. Correspondence between different reference signal information and different frequency bands may be implicit, and in this case, the procedure 303 of notifying the correspondence is not required. For example, when reference signal information corresponding to different frequency bands is borne in a same piece of signaling, a frequency band area on which the reference signal information acts may be determined through a sequence in which the reference signal information occurs in the signaling.

Additionally, in FIG. 3, 303 is shown after 302, but it imposes no limitation on the scope of the embodiment of the present invention. 303 may be included in 302, namely, the correspondence may be included in signaling that bears a reference signal information configuration and notified to the UE together. In a case that the correspondence is borne by adopting other signaling, 303 may be executed after 302, may also be executed before 302, or executed in parallel with 302.

Moreover, the eNB may also not configure any reference signal on a part of frequency bands. Further, the eNB may also notify, through RRC broadcast signaling or RRC dedicated signaling or physical layer signaling, the UE of frequency bands configured with no reference signal, or the eNB may also configure reference signal densities included in reference signal information to be infinitely great, so as to indicate that a part of frequency bands are configured with no reference signal.

304: After receiving the reference signal information, the UE performs channel measurement according to the reference signal information.

The channel measurement refers to that the user equipment generates a reference signal according to the reference signal information corresponding to each frequency band of the N frequency bands, and then measures a channel state between the network side device and the user equipment by utilizing the reference signal, where the channel state includes channel quality and/or an interference level.

The UE obtains reference signal information from the signaling sent by the eNB, where the reference signal information includes a reference signal density.

The UE may also obtain correspondence between different reference signal information configurations and frequency bands from the signaling sent by the eNB, or the UE may also implicitly obtain a frequency band relationship corresponding to different reference signal information configurations, thereby determining reference signal information configurations corresponding to different frequency bands of a same carrier, and then measure channel state information of different frequency bands by utilizing the information.

In a case that the reference signal information notified in 302 further includes a bandwidth based on which a reference signal is generated, the UE generates a reference signal according to the bandwidth, and performs channel measurement by utilizing the reference signal, where the bandwidth is a bandwidth of a frequency band corresponding to the reference signal information, or a bandwidth of any one frequency band of the N frequency bands, or a maximum bandwidth in the N frequency bands, or a total bandwidth of K frequency bands of the N frequency bands, where K is a positive integer smaller than or equal to N.

In the embodiment of the present invention, for different frequency bands in a same carrier, respective reference signal information is configured, so that reference signal densities included in reference signal information of at least two frequency bands are different, so that reference signal information can be designed pointedly according to different measurement demands of different frequency bands, and a reference signal overhead can be reduced in a case that reference signal measurement precision is ensured.

Figure 4:
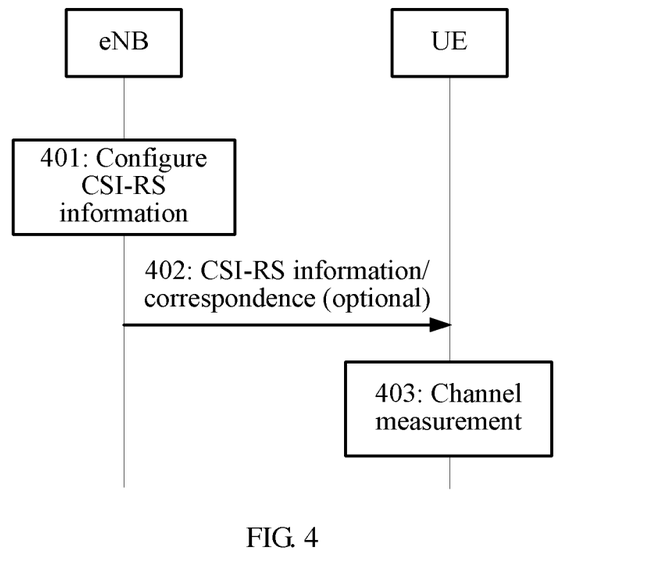
FIG. 4 is a schematic flow chart of a channel measurement procedure according to another embodiment of the present invention.

Embodiments of the present invention are described in more detail in combination with a specific example in the following. FIG. 4 is a schematic flow chart of a channel measurement procedure according to another embodiment of the present invention. In the embodiment of FIG. 4, an adopted reference signal is a CSI-RS.

In this embodiment, an eNB configures a CSI-RS according to a measurement demand, for example, according to different channel states undergone by a UE on different frequency bands in a same carrier and different purposes based on CSI-RS measurement, so as to satisfy channel state measurement precision of different frequency bands and implement maximization of data resource utilization of different frequency bands.

401: The eNB configures CSI-RS information corresponding to N frequency bands in a same carrier.

The eNB configures CSI-RS information corresponding to different frequency bands in a same carrier for each UE according to a measurement demand, including: according to a channel state undergone by each UE on different frequency bands, such as a channel change speed, and different demands of a UE based on CSI-RS measurement, for example, one or more of frequency bands adopt a CSI-RS to perform channel quality measurement, and the other more or one of the frequency bands adopts a CSI-RS to perform channel quality and interference level measurement.

The CSI-RS information may specifically include a reference signal density of a CSI-RS. Additionally, CSI-RS information corresponding to at least one frequency band of N frequency bands further includes: CSI-RS location index information (such as symbol/frequency location), CSI-RS transmit power control information, CSI-RS port information (such as the number of antenna ports), and CSI-RS muting (muting) mode information. In other words, reference signal information corresponding to each frequency band may include the foregoing various types of information. Alternatively, at least one piece of the foregoing information is missing in reference signal information corresponding to at least one frequency band of N frequency bands, while reference signal information corresponding to other frequency bands includes the missing information.

A distribution density of the CSI-RS may be a CSI-RS period (a type of reference signal density) and/or a CSI-RS frequency domain density (another type of reference signal density). For a same frequency band, CSI-RS information may be different for each UE, and may also be the same for each UE. For a same UE, on different frequency bands, CSI-RS configuration periods and/or CSI-RS frequency domain densities on at least two frequency bands are different. A specific CSI-RS information configuration may be implemented by adopting the following two manners:

In a manner 1, extension may be performed in an existing CSI-RS configuration parameter CSI-RS-Config, so that a configuration parameter in the CSI-RS-Config may indicate CSI-RS information corresponding to N frequency bands. Specifically, the CSI-RS-Config may include M1 different CSI-RS period parameters, where the parameters at least indicate CSI-RS periods corresponding to M1 frequency bands; may also include M2 types of different location index information, where the parameters at least indicate location index information occupied by CSI-RSs corresponding to M2 frequency bands; may also include M3 types of different CSI-RS transmit power control information, where transmit power of CSI-RSs corresponding to at least M3 frequency bands may be directly or indirectly obtained by utilizing the parameters; may also include M4 types of port information corresponding to different CSI-RSs, where the parameters at least indicate distribution ports of CSI-RSs corresponding to M4 frequency bands; may also include M5 types of muting modes corresponding to different CSI-RSs, where the parameters at least indicate a CSI-RS mode which has zero transmit power and corresponds to M5 frequency bands, namely, a CSI-RS muting mode; and may also include M6 types of frequency domain densities of different CSI-RSs, where the parameters at least indicate CSI-RS frequency domain distribution densities corresponding to M6 frequency bands. At least one of M1 and M6 is a positive integer not greater than N and not smaller than 2, and M2/M3/M4/M5 is a positive integer not greater than N.

When M1/M2/M3/M4/M5/M6 is not equal to N, namely, some information fields may be missing in CSI-RS configuration parameters corresponding to N-M1, N-M2, N-M3, N-M4, N-M5, and N-M6 frequency bands, a CSI-RS period parameter on N-M1 frequency bands may adopt a configuration same as that of a CSI-RS period corresponding to one or more frequency bands of M1 frequency bands, CSI-RS location index information on N-M2 frequency bands may adopt a configuration same as that of CSI-RS location index information corresponding to one or more frequency bands of M2 frequency bands, CSI-RS transmit power information on N-M3 frequency bands may adopt a configuration same as that of CSI-RS transmit power information corresponding to one or more frequency bands of M3 frequency bands, a corresponding CSI-RS distribution port on N-M4 frequency bands may adopt a configuration same as that of a CSI-RS distribution port corresponding to one or more frequency bands of M4 frequency bands, a corresponding CSI-RS muting mode on N-M5 frequency bands may adopt a configuration same as that of a CSI-RS muting mode corresponding to one or more frequency bands of M5 frequency bands, and a corresponding CSI-RS frequency domain density on N-M6 frequency bands may adopt a configuration same as that of a CSI-RS frequency domain density corresponding to one or more frequency bands of M6 frequency bands. In this case, correspondence between frequency bands adopting a same parameter configuration is commonly known by the eNB and the UE, and may be notified by the eNB to the UE in a explicit manner or in an implicit manner, which is not limited here.

In a manner 2, N pieces of signaling may be further directly introduced and used to indicate CSI-RS information of N frequency bands, and the CSI-RS information may include: a CSI-RS period, CSI-RS location index information, CSI-RS transmit power control information, CSI-RS port information, a CSI-RS muting mode, and a CSI-RS frequency domain density. Meanings of these parameters are described in the foregoing.

If some information fields, such as a CSI-RS distribution port or a muting mode corresponding to a CSI-RS, are missing in CSI-RS configuration parameters of M frequency bands (the M is a positive integer smaller than N) of N frequency bands compared with CSI-RS configuration parameters of other N-M frequency bands, these information fields missing on the M frequency bands adopt a configuration same as that of one or more frequency bands of the other N-M frequency bands by default. Like the manner 1, in this case, correspondence between frequency bands adopting a same parameter configuration is commonly known by the eNB and the UE, and may be notified by the eNB to the UE in a explicit manner or in an implicit manner, which is not limited here.

In this embodiment, particularly, when N=2, if some information fields, such as a CSI-RS distribution port or a muting mode corresponding to a CSI-RS, are missing in a CSI-RS configuration parameter of a first frequency band or a second frequency band compared with the CSI-RS configuration parameter of the second frequency band or the first frequency band, these information fields missing in the first frequency band or the second frequency band adopt a configuration same as that of the second frequency band or the first frequency band by default.

Alternatively, as an example of notifying correspondence between a frequency band and reference signal information, no matter whether the manner 1 or the manner 2 is adopted, the eNB may include, in CSI-RS information, an effective frequency band area corresponding to the CSI-RS information (a correspondence indication manner) or notify an effective frequency band area corresponding to the CSI-RS information through other signaling (another correspondence indication manner), and the effective frequency band area corresponding to the CSI-RS information is used to indicate an effective frequency band on which current CSI-RS information acts. The indication information may adopt an explicit manner. Specifically, an information field may be added in a CSI-RS configuration parameter, and used to indicate effectiveness of the CSI-RS configuration in different frequency bands, and the effectiveness of the CSI-RS configuration in different frequency bands may also be indicated through other signaling. Moreover, the indication information may also adopt an implicit manner. Specifically, with respect to the manner 1, a first CSI-RS configuration parameter may be used for configuring CSI-RS information of a first frequency band, a second CSI-RS configuration parameter may be used for configuring CSI-RS information of a second frequency band, . . . , and an $N^{th}$ CSI-RS configuration parameter may be used for configuring CSI-RS information of an $N^{th}$ frequency band.

The CSI-RS information may further include a bandwidth based on which a CSI-RS is generated, so that the user equipment generates a CSI-RS according to the bandwidth, where the bandwidth is a bandwidth of a frequency band corresponding to the reference signal information, or a bandwidth of any one frequency band of the N frequency bands, or a maximum bandwidth in the N frequency bands, or a total bandwidth of K frequency bands of the N frequency bands, where K is a positive integer smaller than or equal to N. For example, a CSI-RS distributed on the first frequency band may be generated according to a bandwidth of the first frequency band, and the rest may be deduced by analogy. Bandwidth information on which this CSI-RS generating sequence is based may be notified by the eNB to the UE, and the information may also be commonly known by the eNB and the UE in other manners, which is not limited here.

Moreover, for a same UE, the eNB may also not configure any CSI-RS on J frequency bands of N frequency bands, where J is a positive integer smaller than N. In this case, the eNB may make the UE acquire that the J frequency bands have no CSI-RS configuration by configuring a CSI-RS period on the J frequency bands to be infinitely great, or by configuring a CSI-RS frequency domain density on the J frequency bands to be infinitely great, or directly by notifying the UE through signaling, or in other manners.

Moreover, if a channel quality indicator report parameter CQI-ReportConfig includes a precoding matrix index (Precoding Matrix Index, PMI)/rank index (Rank Index, RI) report parameter pmi-RI-Report, an effective frequency domain range of the PMI/RI report parameter needs to be further illustrated. Specifically, an explicit indication, namely, action of the PMI/RI report parameter only on a frequency band part where a CRS and a CSI-RS exist simultaneously; or an explicit indication, namely, addition of an information field, is used to indicate the effective frequency domain range of the PMI/RI report parameter.

402: The eNB notifies the UE of CSI-RS information of different frequency bands in a same carrier.

For a manner of notifying CSI-RS information, reference may be made to the description in 302. For example, the eNB may send CSI-RS modes of different frequency bands to the UE through user equipment-specific (UE-Specific) signaling or cell-specific (Cell-Specific) signaling or physical layer signaling. When the cell-specific signaling is adopted, notification may be given through broadcast signaling (MIB), and may also be given through system information block (System Information Block, SIB) signaling.

403: The UE performs channel measurement according to CSI-RS information of different frequency bands.

The UE receives signaling which bears CSI-RS information and is sent by the eNB, may identify CSI-RS information respectively corresponding to different frequency bands, then generate a CSI-RS by utilizing the information, and measure channel state information of different frequency bands by utilizing the generated CSI-RS.

At least one piece of the following information may be missing in the CSI-RS information corresponding to the at least one frequency band of the N frequency bands: CSI-RS location index information, CSI-RS transmit power control information, CSI-RS port information and CSI-RS muting mode information. In this case, the missing information is obtained according to CSI-RS information corresponding to other frequency bands of the N frequency bands, where the CSI-RS information corresponding to the other frequency bands includes the missing information, and channel measurement is performed according to all reference signal information after the missing information is obtained.

In the embodiment of the present invention, for different frequency bands in a same carrier, respective reference signal information is configured, so that reference signal densities included in reference signal information of at least two frequency bands are different, so that reference signal information can be designed pointedly according to different measurement demands of different frequency bands, and a reference signal overhead can be reduced in a case that reference signal measurement precision is ensured.

Figure 5:
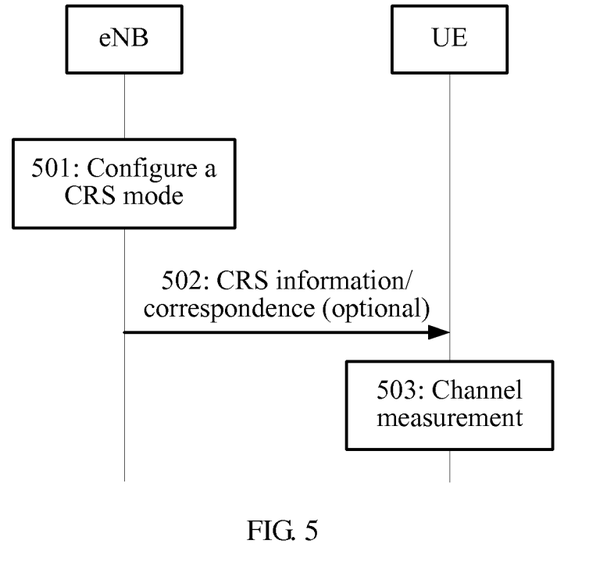
FIG. 5 is a schematic flow chart of a channel measurement procedure according to another embodiment of the present invention.

FIG. 5 is a schematic flow chart of a channel measurement procedure according to another embodiment of the present invention. In the embodiment of FIG. 5, an adopted reference signal is a CRS.

In this embodiment, an eNB configures a CRS according to a measurement demand, for example, according to different demands of a UE on different frequency bands in a same carrier for CRS overheads, so as to satisfy channel state measurement precision of different frequency bands and maximize a data resource.

501: The eNB configures CRS information corresponding to N frequency bands in a same carrier.

The eNB configures CRS information of different frequency bands in a same carrier for each UE according to a measurement demand, including: according to demands of different frequency bands for CRS overheads (for example, when N=2, a first frequency band allows that a CRS may exist in every 1 ms while a second frequency band does not allow that a CRS exists in every 1 ms from the perspective of data resource maximization).

The CRS information may specifically include a CRS reference signal density, and additionally, CRS information corresponding to at least one frequency band of N frequency bands may further include one or more pieces of the following information: CRS transmit power, and CRS port information (such as, the number of occupied antenna ports). In other words, reference signal information corresponding to each frequency band may include the foregoing various types of information. Alternatively, at least one piece of the foregoing information is missing in reference signal information corresponding to at least one frequency band of N frequency bands, while reference signal information corresponding to other frequency bands includes the missing information.

The CRS reference signal density may be a distribution period of a CRS pattern (CRS pattern) on a time domain (a type of reference signal density) and/or a CRS frequency domain density (another type of reference signal density). In a same frequency band, a certain configuration parameter not only may be different for each UE, but also may be the same for each UE. For a same UE, on different frequency bands, CRS pattern configuration periods and/or CRS frequency domain densities on at least two frequency bands are different, and other configuration parameters may be the same, and may also be different. A specific configuration mode may be implemented by adopting the following manners:

Information fields are added, and used to indicate M7 types of different CRS pattern periods and/or M8 types of different CRS frequency domain densities respectively.

Alternatively, an information field is added to indicate M9 types of different CRS transmit power, and is at least used to indicate CRS transmit power of M9 different frequency bands.

Alternatively, an information field is added to indicate M10 types of different CRS port information, and is at least used to indicate CRS port information of M10 different frequency bands.

M7/M8 is a positive integer not greater than N, and M9/M10 is an integer not greater than N and not smaller than zero.

When M7=M8=1, at least the distribution period of the CRS pattern and/or the CRS frequency domain density in the foregoing CRS configuration parameter may be set according to a requirement. For example, the CRS pattern period is not 1 ms and/or the CRS frequency domain density is not 6 sub-carriers. When M9=M10=0, no information field needs to be added to indicate CRS transmit power and CRS port information of different frequency bands, and in this case, CRS transmit power and CRS port information of N frequency bands may both adopt an existing configuration by default.

When M7/M8/M9/M10 is not equal to N, namely, some information fields are missing in CRS configurations corresponding to N-M7/N-M8/N-M9/N-M10 frequency bands, a CRS pattern period on N-M7 frequency bands may adopt a configuration same as that of a CRS pattern period corresponding to one or more frequency bands of M7 frequency bands, and may also adopt a configuration of 1 ms by default; a CRS frequency domain density on N-M8 frequency bands may adopt a configuration same as that of CRS frequency domain density corresponding to one or more frequency bands of M8 frequency bands, and may also adopt a configuration of 6 sub-carriers by default; CRS transmit power on N-M9 frequency bands may adopt a configuration same as that of CRS transmit power corresponding to one or more frequency bands of M9 frequency bands, and may also adopt a configuration same as that of the prior art by default; CRS port information on N-M10 frequency bands may adopt a configuration same as that of CRS port information corresponding to one or more frequency bands of M10 frequency bands, and may also adopt a configuration same as that of the prior art by default. In this case, correspondence between frequency bands adopting a same parameter configuration is commonly known by the eNB and the UE, and may be notified by the eNB to the UE in an explicit manner or in an implicit manner, which is not limited here.

Moreover, as an example of notifying correspondence between a frequency band and reference signal information, in the foregoing implementation manner, the eNB may further configure an effective frequency band area corresponding to CRS information (a correspondence indication manner), and the effective frequency band area corresponding to the CRS information is used to indicate an effective frequency band on which current CRS information acts. The indication information may adopt an explicit manner, and may also adopt an implicit manner. For a specific manner, reference may be made to the description in 401 of FIG. 4, and details are not repeatedly described here.

The CRS information may further include a bandwidth based on which a CRS is generated, so that the user equipment generates a CRS according to the bandwidth, where the bandwidth is a bandwidth of a frequency band corresponding to the reference signal information, or a bandwidth of any one frequency band of the N frequency bands, or a maximum bandwidth in the N frequency bands, or a total bandwidth of K frequency bands of the N frequency bands, where K is a positive integer smaller than or equal to N. For example, a CRS distributed on the first frequency band may be generated according to a bandwidth of the first frequency band, and the rest may be deduced by analogy. Bandwidth information on which this CRS generating sequence is based may be notified by the eNB to the UE, and the information may also be commonly known by the eNB and the UE in other manners, which is not limited here.

Moreover, for a same UE, the eNB may also not configure any CRS on J frequency bands of N frequency bands, where J is a positive integer smaller than N. In this case, the eNB may make the UE acquire that the J frequency bands have no CRS configuration by configuring a CRS pattern period on the J frequency bands to be infinitely great and/or by configuring a CRS frequency domain density on the J frequency bands to be infinitely great, or directly by notifying the UE through signaling, or in other manners.

Moreover, a CRS pattern period not equal to 1 ms or a CRS frequency domain density not equal to 6 sub-carriers may also be applied to frequency bands of different carriers.

In this embodiment, particularly, when N=2, a CRS configuration parameter of the first frequency band may continue to use an existing configuration, and a CRS configuration parameter of the second frequency band may be implemented through the foregoing manner. A CRS pattern period and/or a CRS frequency domain density in the CRS configuration parameter of the second frequency band are different from those of a CRS configuration of the first frequency band, that is, one of the following conditions is satisfied: the CRS pattern period is not 1 ms, and the CRS frequency domain density is not 6 sub-carriers. Moreover, if some information fields, such as CRS distribution port information or transmit power information corresponding to a CRS, are missing in the CRS configuration parameter of the second frequency band compared with the CRS configuration parameter of the first frequency band, a configuration same as that of the first frequency band is adopted on these information fields missing in the second frequency band by default.

502: The eNB notifies the UE of CRS information of N frequency bands in a same carrier.

For a manner of notifying CRS information, reference may be made to the description in 302. For example, the eNB may send CRS information of different frequency bands to the UE through user equipment-specific (UE-Specific) signaling or cell-specific (Cell-Specific) signaling or physical layer signaling. When the cell-specific signaling is adopted, notification may be given through broadcast signaling (MIB), and may also be given through system information block (System Information Block, SIB) signaling.

503: The UE performs channel measurement according to CRS information of different frequency bands.

The UE receives signaling which bears CRS information and is sent by the eNB, may identify CRS configurations respectively corresponding to different frequency bands, then generate a CRS by utilizing the information, and measure channel state information of different frequency bands by utilizing the generated CRS.

At least one piece of the following information may be missing in the CRS information corresponding to the at least one frequency band of the N frequency bands: CRS port information and CRS transmit power information. In this case, the missing information is obtained according to CRS information corresponding to other frequency bands of the N frequency bands, where the CRS information corresponding to the other frequency bands includes the missing information, and channel measurement is performed according to all reference signal information after the missing information is obtained.

In the method in the embodiment of the present invention, a reference signal configuration can be separately performed according to different channel states undergone by a UE on different frequency bands in a same carrier and/or different purposes based on reference signal measurement and/or consideration for reference signal overhead demands of different frequency bands, so as to satisfy channel state measurement precision of different frequency bands and implement maximization of data resource utilization rates of different frequency bands.

Figure 6:
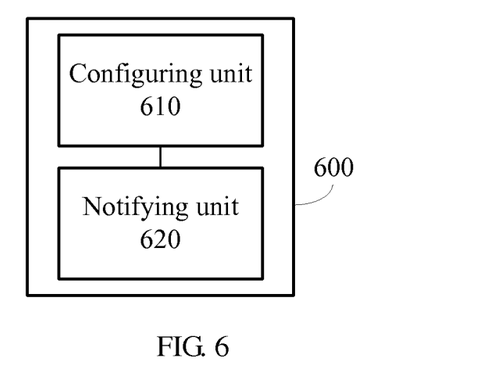
FIG. 6 is a schematic block diagram of a network side device according to an embodiment of the present invention.

FIG. 6 is a schematic block diagram of a network side device according to an embodiment of the present invention. A network side device 600 in FIG. 6 may be, for example, a base station, a base station controller, a radio network controller, a mobility management entity, an access gateway, a multi-cell/multicast coordinated entity, and include a configuring unit 610 and a notifying unit 620.

The configuring unit 610 configures, for each frequency band of N frequency bands having a same carrier frequency, according to a measurement demand, reference signal information corresponding to each frequency band, so that reference signal densities included in configured reference signal information of at least two frequency bands of the N frequency bands are different, where N is a positive integer greater than or equal to 2, the reference signal information refers to information required to generate a reference signal, the reference signal density refers to a distribution density on a time domain or a distribution density on a frequency domain of the reference signal or a pattern of the reference signal. The notifying unit 620 notifies a user equipment of the reference signal information configured by the configuring unit 610, so that the user equipment performs channel measurement according to the reference signal information.

In the embodiment of the present invention, for different frequency bands in a same carrier, respective reference signal information is configured, so that reference signal densities included in reference signal information of at least two frequency bands are different, so that reference signal information can be designed pointedly according to different measurement demands of different frequency bands, and a reference signal overhead can be reduced in a case that reference signal measurement precision is ensured.

A non-limiting example of the network side device 600 in FIG. 6 is the base station (or the eNB) in FIG. 1 to FIG. 5, which can execute each operation related to the network side device in the method shown in FIG. 1 to FIG. 5, so detailed description is appropriately omitted.

For example, the reference signal information configured by the configuring unit 610 further includes a bandwidth based on which the reference signal is generated, so that the user equipment generates the reference signal according to the bandwidth, where the bandwidth is a bandwidth of a frequency band corresponding to the reference signal information, or a bandwidth of any one frequency band of the N frequency bands, or a maximum bandwidth in the N frequency bands, or a total bandwidth of K frequency bands of the N frequency bands, where K is a positive integer smaller than or equal to N.

For example, each frequency band of the N frequency bands is formed of one or more sub-carriers, or formed of one or more physical resource blocks PRB, or formed of one or more resource block groups RBG.

Alternatively, the notifying unit 620 may be further configured to notify the user equipment of correspondence between the reference signal information and each frequency band of the N frequency bands, so that the user equipment acquires, according to the correspondence, reference signal information corresponding to each frequency band of the N frequency bands.

The reference signal may be a CSI-RS, a CRS or a multicast service reference signal. When the reference signal is a CSI-RS, reference signal information which corresponds to at least one frequency band of the N frequency bands and is configured by the configuring unit 610 further includes: CSI-RS location index information, CSI-RS transmit power control information, CSI-RS port information and CSI-RS muting mode information.

Alternatively, as an embodiment, when the reference signal is a CRS, reference signal information which corresponds to at least one frequency band of the N frequency bands and is configured by the configuring unit 610 further includes the following CRS reference signal information: CRS port information and CRS transmit power information.

For example, the notifying unit 620 notifies reference signal information or the foregoing correspondence through a single piece of signaling or N pieces of signaling (such as, radio resource control broadcast signaling, RRC dedicated signaling or physical layer signaling). A notification manner may be explicit or implicit.

Figure 7:
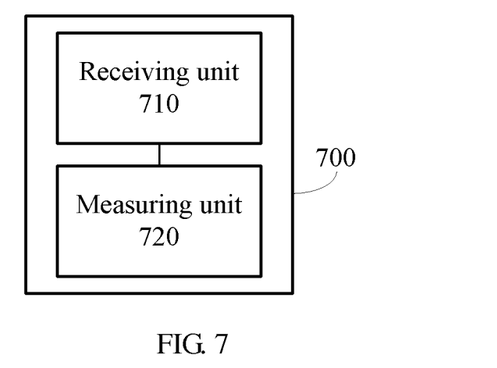
FIG. 7 is a schematic block diagram of a user equipment according to another embodiment of the present invention.

FIG. 7 is a schematic block diagram of a user equipment according to an embodiment of the present invention. A user equipment 700 in FIG. 7 includes a receiving unit 710 and a measuring unit 720.

The receiving unit 710 receives reference signal information which corresponds to each frequency band of N frequency bands and is notified by a network side device, where the N frequency bands have a same carrier frequency, the reference signal information is configured for each frequency band by the network side device according to a measurement demand, and reference signal densities included in configured reference signal information of at least two frequency bands of the N frequency bands are different, where N is a positive integer greater than or equal to 2, the reference signal information refers to information required to generate a reference signal, the reference signal density refers to a distribution density on a time domain or a distribution density on a frequency domain of the reference signal or a pattern of the reference signal.

The measuring unit 720 performs channel measurement according to the reference signal information received by the receiving unit 710.

In the embodiment of the present invention, for different frequency bands in a same carrier, respective reference signal information is configured, so that reference signal densities included in reference signal information of at least two frequency bands are different, so that reference signal information can be designed pointedly according to different measurement demands of different frequency bands, and a reference signal overhead can be reduced in a case that reference signal measurement precision is ensured.

A non-limiting example of the user equipment 700 in FIG. 7 is the user equipment UE in FIG. 1 to FIG. 5, which can execute each operation related to the user equipment in the method shown in FIG. 1 to FIG. 5, so detailed description is appropriately omitted.

For example, the receiving unit 710 is further configured to receive correspondence which is between the reference signal information and each frequency band of the N frequency bands and is notified by the network side device, and acquire, according to the correspondence, reference signal information corresponding to each frequency band of the N frequency bands.

When the reference signal information received by the receiving unit 710 further includes a bandwidth based on which the reference signal is generated, the measuring unit 720 generates the reference signal according to the bandwidth, and performs the channel measurement by utilizing the reference signal, where the bandwidth is a bandwidth of a frequency band corresponding to the reference signal information, or a bandwidth of any one frequency band of the N frequency bands, or a maximum bandwidth in the N frequency bands, or a total bandwidth of K frequency bands of the N frequency bands, where K is a positive integer smaller than or equal to N.

The reference signal may be a CSI-RS, a CRS or a multicast service reference signal. In a case of adopting a CSI-RS, the reference signal information which corresponds to each frequency band and is received by the receiving unit 710 may further include: CSI-RS location index information, CSI-RS transmit power control information, CSI-RS port information and CSI-RS muting mode information. In a case of adopting a CRS, the reference signal information which corresponds to each frequency band and is received by the receiving unit 710 may further include: CRS port information and CRS transmit power information.

When some information is missing in reference signal information which corresponds to at least one frequency band and is received by the receiving unit 710, the measuring unit 720 may obtain the missing information according to reference signal information corresponding to other frequency bands, where the reference signal information corresponding to the other frequency bands includes the missing information, and perform channel measurement according to all reference signal information after obtaining the missing information.

For example, in a case of adopting a CSI-RS, at least one piece of the following information is missing in the reference signal information which corresponds to the at least one frequency band of the N frequency bands and is received by the receiving unit 710: CSI-RS location index information, CSI-RS transmit power control information, CSI-RS port information and CSI-RS muting mode information. In this case, the measuring unit 720 obtains the missing information according to reference signal information corresponding to other frequency bands of the N frequency bands, where the reference signal information corresponding to the other frequency bands includes the missing information, and performs channel measurement according to all reference signal information after obtaining the missing information.

Additionally, in a case of adopting a CRS, at least one piece of the following information is missing in the reference signal information which corresponds to the at least one frequency band of the N frequency bands and is received by the receiving unit 710: CRS port information and CRS transmit power information. In this case, the measuring unit 720 obtains the missing information according to reference signal information corresponding to other frequency bands of the N frequency bands, where the reference signal information corresponding to the other frequency bands includes the missing information, and performs channel measurement according to all reference signal information after obtaining the missing information.

The receiving unit 710 may receive the reference signal information notified, through a single piece of signaling, by the network side device, where the single piece of signaling carries reference signal information corresponding to the N frequency bands. Alternatively, the receiving unit 710 may receive the reference signal information notified, through N pieces of signaling, by the network side device, where each of the N pieces of signaling carries the reference signal information corresponding to each frequency band of the N frequency bands.

A communication system according to an embodiment of the present invention may include the network side device 600 or the user equipment 700.

A person of ordinary skill in the art may be aware that, units and algorithm steps of each example described in combination with the embodiments disclosed in this specification can be implemented by electronic hardware, computer software, or a combination of the two. In order to clearly describe interchangeability between hardware and software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

A person skilled in the art may clearly understand that, for the purpose of convenient and brief description, for a detailed working process of the foregoing system, apparatus, and unit, reference may be made to the corresponding process in the foregoing method embodiments, and details are not repeatedly described here.

In the several embodiments provided in the present application, it should be understood that the disclosed system, apparatus, and method may be implemented in other manners. For example, the described apparatus embodiment is merely exemplary. For example, dividing of the units is merely a type of logical function dividing, and there may be other dividing manners during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separated, and parts displayed as units may or may not be physical units, may be located in one position, or may be distributed on a plurality of network units. A part or all of the units may be selected according to actual needs to achieve the purposes of the solutions of the embodiments.

In addition, functional units in the embodiments of the present invention may be integrated into one processing unit, each of the units may exist alone physically, and two or more units may also be integrated into one unit. The integrated unit may be implemented in a form of hardware, and may also be implemented in a form of a software functional unit.

When the integrated unit is implemented in a form of a software functional unit and sold or used as an independent product, the integrated unit may be stored in a computer-readable storage medium. Based on such understanding, the technical solutions of the present invention essentially, or the part contributing to the prior art, or all or a part of the technical solutions may be embodied in a form of a software product. The computer software product is stored in a storage medium, and includes several instructions for instructing a computer device (which may be a personal computer, a server, or a network device, or the like) to perform all or a part of the steps of the methods described in the embodiments of the present invention. The foregoing storage medium includes: any medium that is capable of storing program codes, such as a USB flash disk, a removable hard disk, a read-only memory (ROM, Read-Only Memory), a random access memory (RAM, Random Access Memory), a magnetic disk, or an optical disk.

The foregoing description is merely specific implementation manners of the present invention, but is not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A channel measurement method, comprising:
   identifying, by a base station, for each frequency band of N frequency bands having a same carrier frequency, reference signal information corresponding to each frequency band, so that reference signal densities of the reference signal information of at least two frequency bands of the N frequency bands differ according to a corresponding measurement demand of the at least two frequency bands,
   wherein N is a positive integer greater than or equal to 2, the reference signal information refers to information used to generate a reference signal, the reference signal densities refer to any one of: a distribution density on a time domain of the reference signal, a distribution density on a frequency domain of the reference signal, a distribution density on a time domain of a pattern of the reference signal and a distribution density on a frequency domain of a pattern of the reference signal; and
   notifying, by the base station, a user equipment of the reference signal information to allow channel measurement to be performed according to the reference signal information.

2. The method according to claim 1, wherein after the identifying of the reference signal information the method further comprises:
   notifying the user equipment of a correspondence between the reference signal information and each frequency band of the N frequency bands, so that the user equipment acquires, according to the correspondence, reference signal information corresponding to each frequency band of the N frequency bands.

3. The method according to claim 1, wherein the reference signal information further comprises:
   a bandwidth based on which the reference signal is generated, so that the user equipment generates the reference signal according to the bandwidth, wherein the bandwidth is a bandwidth of a frequency band corresponding to the reference signal information, or a bandwidth of any one frequency band of the N frequency bands, or a maximum bandwidth in the N frequency bands, or a total bandwidth of K frequency bands of the N frequency bands, wherein K is a positive integer smaller than or equal to N.

4. The method according to any one of claims 1, wherein a reference signal configured within each frequency band of the N frequency bands is a channel-state information reference signal CSI-RS; and
   the reference signal information corresponding to at least one frequency band of the N frequency bands further comprises: CSI-RS location index information, CSI-RS transmit power control information, CSI-RS port information and CSI-RS muting mode information; or a reference signal configured within each frequency band of the N frequency bands is a cell-specific reference signal CRS; and reference signal information corresponding to at least one frequency band of the N frequency bands further comprises the following CRS reference signal information: CRS port information and CRS transmit power information.

5. A channel measurement method, comprising:

receiving, by a user equipment, reference signal information which corresponds to each frequency band of N frequency bands and is notified by a network device, wherein the N frequency bands have a same carrier frequency, the reference signal information is identified for each frequency band by the network device, and reference signal densities of the reference signal information of at least two frequency bands of the N frequency bands differ according to a corresponding measurement demand of the at least two frequency bands, wherein N is a positive integer greater than or equal to 2, the reference signal information refers to information used to generate a reference signal, the reference signal refer to any one of: a distribution density on a time domain of the reference signal, a distribution density on a frequency domain of the reference signal, a distribution density on a time domain of a pattern of the reference signal, and a distribution density on a frequency domain of a pattern of the reference signal; and performing, by the user equipment, channel measurement according to the reference signal information.

6. The method according to claim 5, wherein before the performing channel measurement according to the reference signal information, the method further comprises:

receiving a correspondence between the reference signal information notified by the network device and each frequency band of the N frequency bands; and acquiring, according to the correspondence, the reference signal information corresponding to each frequency band of the N frequency bands.

7. The method according to claim 5, wherein the reference signal information further comprises a bandwidth based on which the reference signal is generated; and the performing channel measurement according to the reference signal information comprises:

generating the reference signal according to the bandwidth; and performing the channel measurement by utilizing the reference signal, wherein the bandwidth is a bandwidth of a frequency band corresponding to the reference signal information, or a bandwidth of any one frequency band of the N frequency bands, or a maximum bandwidth in the N frequency bands, or a total bandwidth of K frequency bands of the N frequency bands, wherein K is a positive integer smaller than or equal to N.

8. The method according to claim 5, wherein a reference signal configured within each frequency band of the N frequency bands is a channel-state information reference signal CSI-RS; and the reference signal information corresponding to each frequency band further comprises: CSI-RS location index information, CSI-RS transmit power control information, CSI-RS port information and CSI-RS muting mode information; or wherein a reference signal configured within each frequency band of the N frequency bands is a cell-specific reference signal CRS; and the reference signal information corresponding to each frequency band further comprises: CRS port information and CRS transmit power information.

9. The method according to claim 5, wherein a reference signal configured within each frequency band of the N frequency bands is a channel-state information reference signal CSI-RS;

at least one piece of the following information is missing in the reference signal information corresponding to the at least one frequency band of the N frequency bands: CSI-RS location index information, CSI-RS transmit power control information, CSI-RS port information and CSI-RS muting mode information; and the performing channel measurement according to the reference signal information further comprises:

obtaining the missing information according to reference signal information corresponding to other frequency bands of the N frequency bands, wherein the reference signal information corresponding to the other frequency bands comprises the missing information; and performing channel measurement according to all reference signal information after obtaining the missing information.

10. The method according to claim 5, wherein a reference signal configured within each frequency band of the N frequency bands is a cell-specific reference signal CRS;

at least one piece of the following information is missing in the reference signal information corresponding to the at least one frequency band of the N frequency bands: CRS port information and CRS transmit power information; and the performing channel measurement according to the reference signal information further comprises:

obtaining the missing information according to reference signal information corresponding to other frequency bands of the N frequency bands, wherein the reference signal information corresponding to the other frequency bands comprises the missing information; and performing channel measurement according to all reference signal information after obtaining the missing information.

11. A base station, comprising:

a processor configured to identify, for each frequency band of N frequency bands having a same carrier frequency, reference signal information corresponding to each frequency band, so that reference signal densities of the reference signal information of at least two frequency bands of the N frequency bands differ according to a corresponding measurement demand of the at least two frequency bands, wherein N is a positive integer greater than or equal to 2, the reference signal information refers to information used to generate a reference signal, the reference signal densities refer to any one of: a distribution density on a time domain of the reference signal, a distribution density on a frequency domain of the reference signal, a distribution density on a time domain of a pattern of the reference signal and a distribution density on a frequency domain of a pattern of the reference signal; and a transmitter configured to notify a user equipment of the reference signal information configured by the processor to allow channel measurement to be performed according to the reference signal information.

12. The base station according to claim 11, wherein the transmitter is configured to notify the user equipment of correspondence between the reference signal information and each frequency band of the N frequency bands, so that the user equipment acquires, according to the correspondence, reference signal information corresponding to each frequency band of the N frequency bands.

13. The base station according to claim 11, wherein the reference signal information configured by the processor comprises a bandwidth based on which the reference signal is generated, so that the user equipment generates the reference signal according to the bandwidth, wherein the bandwidth is a bandwidth of a frequency band corresponding to the reference signal information, or a bandwidth of any one frequency band of the N frequency bands, or a maximum bandwidth in the N frequency bands, or a total bandwidth of K frequency bands of the N frequency bands, wherein K is a positive integer smaller than or equal to N.

14. The base station according to claim 11,
wherein a reference signal configured within each frequency band of the N frequency bands is a channel-state information reference signal CSI-RS; and reference signal information which corresponds to at least one frequency band of the N frequency bands and is configured by the processor according to CSI-RS location index information, CSI-RS transmit power control information, CSI-RS port information and CSI-RS muting mode information; or
wherein a reference signal configured within each frequency band of the N frequency bands is a cell-specific reference signal CRS; and reference signal information which corresponds to at least one frequency band of the N frequency bands and is configured by the processor according to CRS reference signal information, CRS port information and CRS transmit power information.

15. A user equipment, comprising:
a receiver configured to receive reference signal information which corresponds to each frequency band of N frequency bands from a network device, wherein the N frequency bands have a same carrier frequency, the reference signal information is identified for each frequency band by the network device, and reference signal densities of the reference signal information of at least two frequency bands of the N frequency bands differ according to a corresponding measurement demand of the at least two frequency bands, wherein N is a positive integer greater than or equal to 2, the reference signal information refers to information used to generate a reference signal, the reference signal densities refer to any one of: a distribution density on a time domain of the reference signal, a distribution density on a frequency domain of the reference signal, a distribution density on a time domain of a pattern of the reference signal and a distribution density on a frequency domain of a pattern of the reference signal; and
a processor configured to perform channel measurement according to the reference signal information received by the receiver.

16. The user equipment according to claim 15, wherein
the receiver is further configured to receive correspondence which is between the reference signal information and each frequency band of the N frequency bands and is notified by the network device, and acquire, according to the correspondence, reference signal information corresponding to each frequency band of the N frequency bands.

17. The user equipment according to claim 15, wherein
the reference signal information received by the receiver further comprises a bandwidth based on which the reference signal is generated; and
the processor generates the reference signal according to the bandwidth, and performs the channel measurement by utilizing the reference signal,
wherein the bandwidth is a bandwidth of a frequency band corresponding to the reference signal information, or a bandwidth of any one frequency band of the N frequency bands, or a maximum bandwidth in the N frequency bands, or a total bandwidth of K frequency bands of the N frequency bands, wherein K is a positive integer smaller than or equal to N.

18. The user equipment according to claim 15,
wherein a reference signal configured within each frequency band of the N frequency bands is a channel-state information reference signal CSI-RS; and the reference signal information which corresponds to each frequency band and is received by the receiver further comprises: CSI-RS location index information, CSI-RS transmit power control information, CSI-RS port information and CSI-RS muting mode information; or
wherein a reference signal configured within each frequency band of the N frequency bands is a cell-specific reference signal CRS; and the reference signal information which corresponds to each frequency band and is received by the receiver further comprises: CRS port information and CRS transmit power information.

19. The method according to claim 15, wherein a reference signal configured within each frequency band of the N frequency bands is a channel-state information reference signal CSI-RS;
at least one piece of the following information is missing in reference signal information which corresponds to at least one frequency band of the N frequency bands and is received by the receiver: CSI-RS location index information, CSI-RS transmit power control information, CSI-RS port information and CSI-RS muting mode information; and
the processor is further configured to obtain the missing information according to reference signal information corresponding to other frequency bands of the N frequency bands, wherein the reference signal information corresponding to the other frequency bands comprises the missing information, and perform channel measurement according to all reference signal information after obtaining the missing information.

20. The user equipment according to claim 15, wherein a reference signal configured within each frequency band of the N frequency bands is a cell-specific reference signal CRS;
at least one piece of the following information is missing in reference signal information which corresponds to at least one frequency band of the N frequency bands and is received by the receiver: CRS port information and CRS transmit power information; and
the processor is further configured to obtain the missing information according to reference signal information corresponding to other frequency bands of the N frequency bands, wherein the reference signal information corresponding to the other frequency bands comprises the missing information, and perform channel measurement according to all reference signal information after obtaining the missing information.

* * * * *